United States Patent [19]

Keller, Jr.

[11] Patent Number: 4,899,774
[45] Date of Patent: Feb. 13, 1990

[54] FLUIDIC DENSITY CONTROL FOR CHLOR ALKALI CELLS

[76] Inventor: R. Davidson Keller, Jr., 1870 Oak Circle Dr., Dunedin, Fla. 34698

[21] Appl. No.: 354,723

[22] Filed: May 22, 1989

[51] Int. Cl.⁴ ............................................. G05D 11/00
[52] U.S. Cl. ............................................ 137/4; 137/91
[58] Field of Search ................................ 137/91, 4, 3

[56] References Cited

U.S. PATENT DOCUMENTS

| | | | |
|---|---|---|---|
| 1,990,501 | 2/1935 | Poirier | 137/4 |
| 4,548,226 | 10/1985 | Iino | 137/91 |
| 4,601,306 | 7/1986 | Engelhardt | 137/91 |
| 4,613,415 | 9/1986 | Wreath | 204/98 |

Primary Examiner—Alan Cohan
Attorney, Agent, or Firm—Stanley M. Miller

[57] ABSTRACT

The density of a caustic liquid is reduced by automatically adding water to the caustic when the specific gravity of the caustic is unacceptably high. A small stream of water is continuously directed over the head of a specially designed hydrometer. As long as the density of the caustic is within acceptable ranges, the stream of water flows uninterrupted over the head of the hydrometer and has no effect on the caustic. However, when the density of the caustic rises to unacceptable levels, the hydrometer rises and its head intercepts the stream of water and deflects it downwardly into the caustic, thereby diluting it. When sufficient water has been added to the caustic to bring its density back to acceptable levels, the hydrometer sinks and the water resumes flowing over the hydrometer to a collection station where it is recycled.

20 Claims, 1 Drawing Sheet

4,899,774

FLUIDIC DENSITY CONTROL FOR CHLOR ALKALI CELLS

BACKGROUND OF THE INVENTION

1. Field of the Invention

This invention relates, generally, to improvements in electrolytic cells that generate chlorine gas and caustic and deliver those products to a swimming pool. More particularly, it relates to an improved to an improved means for controlling the density of the caustic liquid therein.

2. Description of the Prior Art

U.S. Pat. No. 4,613,415 to the present inventors and the references of record therein are believed to represent the most relevant prior art to this disclosure.

In that patent, a hydrometer having a color-coded neck is provided so that as the density of the caustic (sodium hydroxide) in the catholyte increases toward the end of the batch life, the hydrometer rises and the color code on the neck thereof alerts the cell owner that a fresh batch of catholyte is needed. However, no means for preventing the undesirable increase in the specific gravity of the caustic is provided in that disclosure.

More importantly, the prior art neither teaches nor suggests how the increase in specific gravity of the sodium hydroxide in the catholyte that naturally occurs after prolonged operation of the cell could be prevented.

SUMMARY OF THE INVENTION

The present invention employs a hydrometer disposed in the caustic as in the earlier patent to the present inventors, but the need for the color code is obviated.

Instead, means are provided to dilute the caustic as its specific gravity approaches high levels; the dilution eliminates the need to prepare a new batch of catholyte.

Specifically, a small horizontal stream of water is directed over the neck of a modified hydrometer which is conventionally mounted so that it rises as the specific gravity of the caustic within which it is immersed increases.

The stream of water does not impinge upon the neck of the hydrometer when the specific gravity of the caustic is within acceptable levels. However, as the density of the caustic increases due to the flow of additional materials into the catholyte as the cell operates, the hydrometer rises and the neck thereof enters into the stream of water and deflects it into the catholyte. The resulting dilution lowers the specific gravity of the caustic to acceptable levels; the hydrometer drops back down and its neck exits the stream of water.

Thus, the need to monitor the position of the hydrometer is eliminated, and a self-diluting means is provided for automatically maintaining the specific gravity of the caustic at desired levels. Thus, the lifetime of each batch of catholyte is significantly extended.

It is therefore understood that the primary object of this invention is to provide an automatic fluid density control for chlor alkali and similar electrolytic cells.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
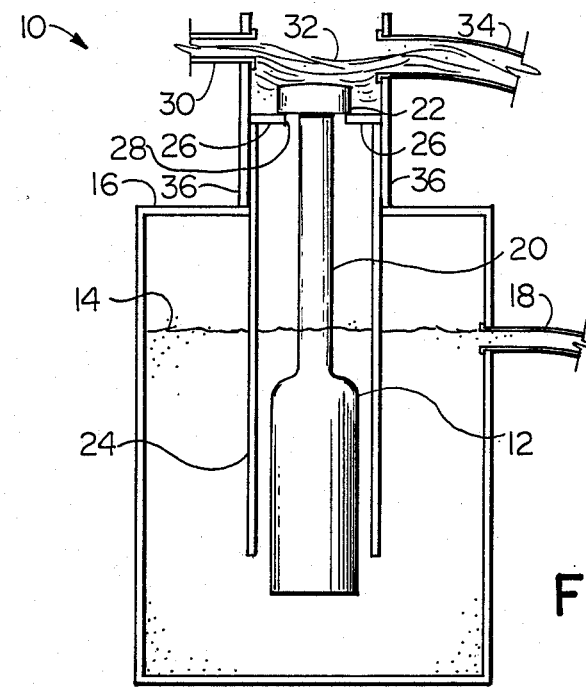
FIG. 1 is a side sectional view of the catholyte reservior of an electrolytic cell, showing the position of a hydrometer when the specific gravity of the caustic in the catholyte is at an acceptable level and showing the stream of water flowing over the hydrometer's neck.

Referring first to FIG. 1, it will there be seen that the novel apparatus is denoted by the reference numeral 10 as a whole.

A hydrometer means includes a body 12 immersed in catholyte 14 contained within a reservoir 16 having an overflow means 18. A comprehensvie description of the environment of the hydrometer means and the reservoir is provided in the patent of the present inventors referred to hereinabove.

The hydrometer means also includes a neck 20 surmounted by head member 22 as shown. The hydrometer is slideably mounted in cylinder 24 that is fixedly secured to the reservoir 16 and which therefore does not move; a radially inwardly directed flange 26 is provided at the uppermost end of cylinder 24 to guide neck 20 of hydrometer 12.

The head of the hydrometer has a diamter greater than the central opening 28 formed by flange 26 so that said head 22 cannot drop below its FIG. 1 position. Thus, flange 26 is also a support means for the head 22 and determines the height below which the hydrometer 12 cannot drop. Accordingly, the height of flange 26 is predetermined and is based upon the position of hydrometer body 12 when the specific gravity of the caustic is at the desired optimal level.

A nozzle means 30 is spaced vertically upwardly of flange 26 and directs a continuous small stream of water 32 in a horizontal direction a shown in FIG. 1.

A conduit means 34 collects the stream of water 32 and directs it to waste or, preferably, to a re-cycling station.

The conduit means 34 is secured to a sleeve member 36 that surmounts reservoir 16 as shown, said sleeve member providing a stabilizing means for hydrometer cylinder 24 and said sleeve member being in open communication with the interior of the reservoir 16 as depicted.

Sleeve member 36 also advantageously provides the mounting means to which nozzle means 30 is mounted, as shown. The nozzle means 30 and the conduit means 34 are disposed in diameteric opposition to one another.

It should be understood that FIG. 1 depicts the position of the hydrometer when the specific gravity of the caustic in the catholyte 14 is at an acceptable level, and it should also be understood that stream of water 32 flows continuously, even when the hydrometer body 12 is in its FIG. 1 position.

Figure 2:
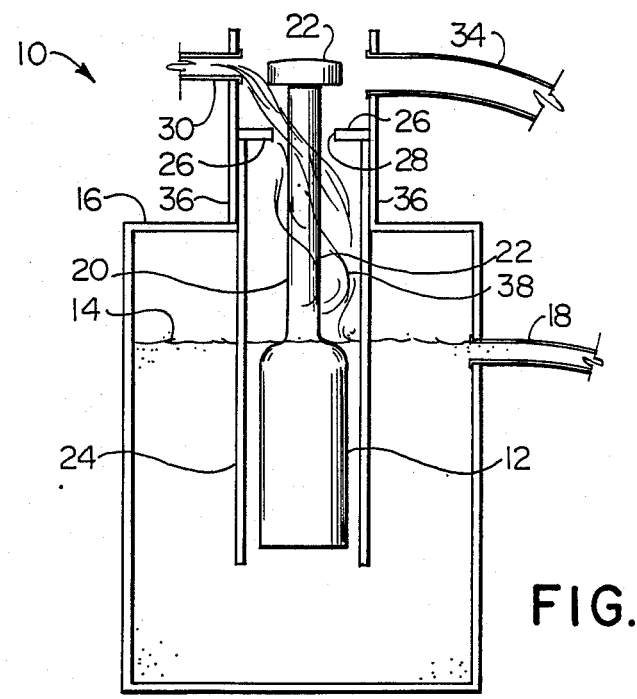
FIG. 2 is the same side view as FIG. 1, but showing the position of the hydrometer when the specific gravity of the caustic is unacceptable high and showing how the raised neck of the hydrometer intercepts the small stream of water and directs it into the catholyte.

FIG. 2 depicts the same parts as shown in FIG. 1, but with the hydrometer body 12 in a raised position caused by an increase in the specific gravity of the caustic in the catholyte 14. Head 22 has entered into the stream of water 32 and is deflecting it downwardly into the catholyte 14 as depicted. Head 22 is thus a water deflecting means and may have any configuration that accomplishes its purpose. The water runs down the neck 20 of the hydrometer means or otherwise splashes downwardly into the catholyte 14 as depicted by drops 38.

The water 38 from stream 32 serves to dilute the catholyte 14; hydrometer body 12 eventually drops downwardly as the specific gravity of the caustic in the catholyte drops as a result of the dilution, until eventually head 22 of hydrometer means again falls below steam 32 and the water 32 again streams into conduit 34 and the dilution of the catholyte stops until the density of the catholyte again approaches unacceptable levels.

Clearly, the novel apparatus 10 need not be monitored as frequently as the color-coded hydrometer of the prior art. Just as importantly, the novel apparatus operates substantially in the absence of human intervention, being entirely automatic.

The novel apparatus also greatly extends the time between new batch preparation.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An apparatus for diluting a caustic liquid when its density exceeds a predetermined level, comprising:
    a reservoir means for containing a caustic liquid;
    a hydrometer means flotably disposed within said caustic liquid;
    a continuously flowing stream of water flowing over said caustic liquid and said hydrometer means; and
    water deflecting means associated with said hydrometer for deflecting at least a part of said stream of water into said caustic liquid when the density of said caustic liquid exceeds a predertermined threshold.

2. The apparatus of claim 1, wherein said hydrometer means includes a hydrometer body, an elongate neck means that extents upwardly of said body, and a head member that surmounts said neck means, said head member providing said water delecting means.

3. The apparatus of claim 2, wherein said head member is specfically configured to deflect at least a part of said stream of water downwardly into said caustic when said head member interrupts said flow.

4. The apparatus of claim 3, further comprising means for supporting said head member in a position spaced downwardly of said stream of water when the density of the caustic is within acceptable levels.

5. The apparatus of claim 4, wherein said means for supporting said head member includes a sleeve member that surmounts said reservoir means, said sleeve member having an inwardly directed flange member with a central opening that slidably receives said neck means and which flange member supports said head member thereatop, said head member having a diameter greater than the diameter of said central opening.

6. The apparatus of claim 5, wherein said stream of water is a horizontal flow of water and wherein a conduit means collects and recycles the water that is not deflected into the caustic by said head member.

7. The apparatus of claim 6, wherein said steam of water is ejected by a nozzle means mounted to said sleeve member.

8. The apparatus of claim 7, wherein said conduit means is mounted to said sleeve member is diametric opposition to said nozzle means.

9. An apparatus for diluting a caustic liquid, comprising:
    a reservoir means for containing a caustic liquid;
    a hydrometer having a body that is immersed within the caustic liquid;
    said hydrometer having an elongate, upwardly extending neck means;
    a head member that surmounts said neck means;
    supporting means for supporting said head member at a predetermined height so that said head member cannot fall below said predetermined height;
    nozzle means for directing a stream of water in a horizontal direction; and said nozzle means being positioned a predetermined distance above said head member when said head member is supported by said supporting means;
    whereby said head member rises into the path of said stream of water when said hydrometer rises due to an increase in the density of said caustic liquid;
    whereby said head member, when in its elevated position, deflects said stream of water downwardly into the caustic liquid, thereby diluting it; and
    whereby said hydrometer sinks when the density of said caustic liquid has decreased due to said dilution and said head member exits the stream of water so that said dilution of the caustic liquid ends.

10. The apparatus of claim 9, wherein said supporting means includes a sleeve member disposed in open communication with said reservior means so that said neck means extends into said sleeve member.

11. The apparatus of claim 10, whereein said supporting means further includes a radially inwardly directed flange fixedly secured to inner side walls of said sleeve member.

12. The apparatus of claim 10, wherein said flange means has a central opening that slideably receives said neck means, the breadth of said central opening being less than the breadth of said head member 20 that said head member is supported by said flange means when the density of the caustic is at an acceptable level.

13. The apparatus of claim 12, wherein said nozzle means is mounted to said sleeve member.

14. The apparatus of claim 13, further comprising means for collecting water not deflected into said caustic so that said water can be recycled.

15. The apparatus of claim 14, wherein said means for collecting undeflected water includes a conduit means mounted to said sleeve member in diametric opposition to said nozzle means.

16. A method for automatically controlling the density of a fluid, comprising the steps of:
    positioning a hydrometer means within the fluid; and directing a steam of water over the top of said hydrometer means so that when the hydrometer rises in response to an increase in the density of the fluid, the hydrometer will interrupt said stream of water and deflect at least a part of the water into the fluid, thereby reducing the density of the fluid.

17. The method of claim 16, further comprising the step of providing the hydrometer with an elongate neck means having an uppermost end that deflects water flowing in said stream in a downward direction into the fluid.

18. The method of claim 17, further comprising the step of directing said stream of water in a horizontal stream and positioning said stream so that it flows over the uppermost end of said hydrometer neck means as long as the density of the fluid is an acceptable density.

19. The method of claim 18, further comprising the step of collecting and recycling water not deflected into the fluid.

20. The method of claim 19, further comprising the step of positioning the source of said stream of water and a mass for collecting undeflected water in diametric opposition to one another.

* * * * *